(12) United States Patent
Martelli

(10) Patent No.: US 9,886,291 B2
(45) Date of Patent: Feb. 6, 2018

(54) METHOD FOR MONITORING CHANGES OF CONFIGURATION OF A CONTROL DEVICE OF AN AUTOMATIC MACHINE

(75) Inventor: Davide Martelli, Amsterdam (NL)

(73) Assignee: CAMPATENTS B.V., Amsterdam (NL)

( * ) Notice: Subject to any disclaimer, the term of this patent is extended or adjusted under 35 U.S.C. 154(b) by 526 days.

(21) Appl. No.: 13/809,201

(22) PCT Filed: Jul. 11, 2011

(86) PCT No.: PCT/IB2011/001607
§ 371 (c)(1),
(2), (4) Date: Mar. 22, 2013

(87) PCT Pub. No.: WO2012/004662
PCT Pub. Date: Jan. 12, 2012

(65) Prior Publication Data
US 2013/0219158 A1 Aug. 22, 2013

(30) Foreign Application Priority Data

Jul. 9, 2010 (IT) .............................. BO2010A0434

(51) Int. Cl.
*G06F 9/445* (2006.01)
*G05B 19/042* (2006.01)

(52) U.S. Cl.
CPC ....... *G06F 9/44505* (2013.01); *G05B 19/042* (2013.01); *G05B 2219/23335* (2013.01); *G05B 2219/25066* (2013.01)

(58) Field of Classification Search
None
See application file for complete search history.

(56) References Cited

U.S. PATENT DOCUMENTS 6,650,958 B1 * 11/2003 Balazs et al. ................. 700/121
6,704,933 B1 * 3/2004 Tanaka ...................... G06F 8/60
348/E5.006

(Continued)

FOREIGN PATENT DOCUMENTS

EP 1 688 840 A2 * 2/2006
EP 1688840 A2 8/2006
EP 2116911 A1 11/2009

OTHER PUBLICATIONS

International Search Report and Written Opinion dated Dec. 1, 2011 for corresponding International Patent Application No. PCT/IB2011/001607 consisting of 12 pages.

*Primary Examiner* — Ilwoo Park
(74) *Attorney, Agent, or Firm* — Ohlandt, Greeley, Ruggiero & Perle, LLP

(57) ABSTRACT

In an automatic machine controlled by a control device of its own having at least one non-volatile memory, in which a program for controlling the automatic machine can be installed, and at least one processing module for executing the control program installed, the control device is programmed with an operating system designed for implementing a method for monitoring the changes of configuration of the control device, in which each event of installation of a new control program in the memory is detected, execution of the control program installed last is enabled, and each new control program that is installed is saved, together with corresponding installation data, in at least one archive memory portion of the memory.

17 Claims, 2 Drawing Sheets

(56) References Cited

U.S. PATENT DOCUMENTS

| | | | |
|---|---|---|---|
| 2002/0026554 A1* | 2/2002 | Fackler | 711/103 |
| 2004/0031030 A1* | 2/2004 | Kidder | G06F 1/14 |
| | | | 717/172 |
| 2006/0075077 A1* | 4/2006 | Brookner | 709/220 |
| 2007/0004051 A1 | 1/2007 | Okumoto et al. | |
| 2010/0122245 A1* | 5/2010 | Igarashi et al. | 717/170 |

* cited by examiner

METHOD FOR MONITORING CHANGES OF CONFIGURATION OF A CONTROL DEVICE OF AN AUTOMATIC MACHINE

TECHNICAL FIELD

The present invention relates to a method for monitoring changes of configuration of a control device of an automatic machine.

In particular, the present invention finds advantageous, though non-exclusive, application in automatic machines used in the packaging industry, such as, for example, cartoning machines, packaging machines, blister-packing machines, etc., to which the ensuing description will make explicit reference, without this implying any loss of generality.

BACKGROUND ART

The majority of automatic machines used in the packaging industry normally comprise an electronic control unit for controlling operation of the automatic machine. The electronic control unit comprises an electronic card, mounted on which is a programmable controller, for example a PLC (programmable-logic controller) device, configured for running a program for controlling the automatic machine. The electronic card comprises a memory module for storing the control program. The most modern electronic cards can be interfaced with external computers, for example an appropriately programmed personal computer, via one or more communication ports, for example serial communication ports.

Whenever it is desired to replace the program for controlling the automatic machine, for example with an updated version of the control program or else with a totally new control program, the memory module is replaced with a new memory module containing the new or updated control program, or else, more commonly, the new control program is installed directly in the memory module by means of an external computer interfaced with the electronic card by means of the communication port. It is expedient for the re-programming of the automatic machine to be performed by specialized staff with a good knowledge of the logic of operation of the automatic machine, typically technicians authorized by the producer of the automatic machine. It frequently happens, instead, that re-programming is performed by the end user, who frequently is not fully aware, at least as are, instead, authorized technicians, of the detailed operation of the automatic machine, and hence could re-program the automatic machine in an erroneous way, thus increasing the risk of consequent malfunctioning or breakdown of the automatic machine that is difficult to identify even by authorized technicians. In addition, when the end user is re-programming the automatic machine non having sufficient acquaintance with it, he could involuntarily change some fundamental characteristics of the program, such as the general logic of operation and/or the overall time of execution of the program to an extent such as to render the automatic machine and/or the control unit no longer compliant with the guarantee, or even worse, such as to render the automatic machine no longer safe for the operator and/or no longer able to provide a product in conformance with requirements of safety for the consumer.

Consequently, in order to understand whether the malfunctioning has a hardware origin (the automatic machine in itself) or a software origin (programming of the control device), authorized technicians frequently first replace the electronic card with a new one: if the machine continues to function badly, then the failure is on the machine; otherwise, it means that the malfunctioning was caused by the control program, the origin of which, i.e., who has installed it and when, is frequently not known.

PLC devices used for controlling automatic machines are normally of a modular type; namely, they comprise at least one processing module, which comprises the processor and the memory on which the control program can be installed, and a plurality of additional modules, for example, digital or analog input/output modules governed by the processing module for acquiring field signals and for driving the various electromechanical actuators of the automatic machine, communication modules, and complementary processing modules. This modular structure presents the following advantages: it can be expanded at will by adding processing modules or input/output modules according to the requirements of the automatic machine and enables easy maintenance in so far as the modules can be replaced individually in the event of failure. The ease of replacement of a module can constitute, however, a risk for reliability for the automatic machine. In fact, the end user of the automatic machine, or in general unauthorized staff, could easily replace an original module with another module having characteristics that do not meet the requirements of design and operation of the automatic machine to an extent such as to render the automatic machine and/or the control unit no longer compliant with the guarantee, or even worse, such as to render the automatic machine no longer safe for the operator and/or no longer able to provide a product compliant with requirements of safety for the consumer.

DISCLOSURE OF INVENTION

The aim of the present invention is to provide a method for monitoring changes of configuration of a programmable control device of an automatic machine and a programmable control device configured for implementing said method that will enable the drawbacks described above to be overcome and, at the same time, will be easy and inexpensive to produce. In other words, the aim of the present invention is to provide a method for monitoring changes of configuration of a programmable control device that will guarantee traceability of any modification of the hardware, firmware, and software of the control device following upon repair, replacement, or updating of the control device itself.

In accordance with the present invention, a method for monitoring changes of configuration of a control device of an automatic machine, a control device for an automatic machine, and an automatic machine are provided according to what is defined in the annexed claims.

BRIEF DESCRIPTION OF THE DRAWINGS

The present invention will now be described with reference to the annexed drawings, which illustrate a non-limiting example of embodiment thereof, and in which.

BEST MODE FOR CARRYING OUT THE INVENTION

Figure 1:
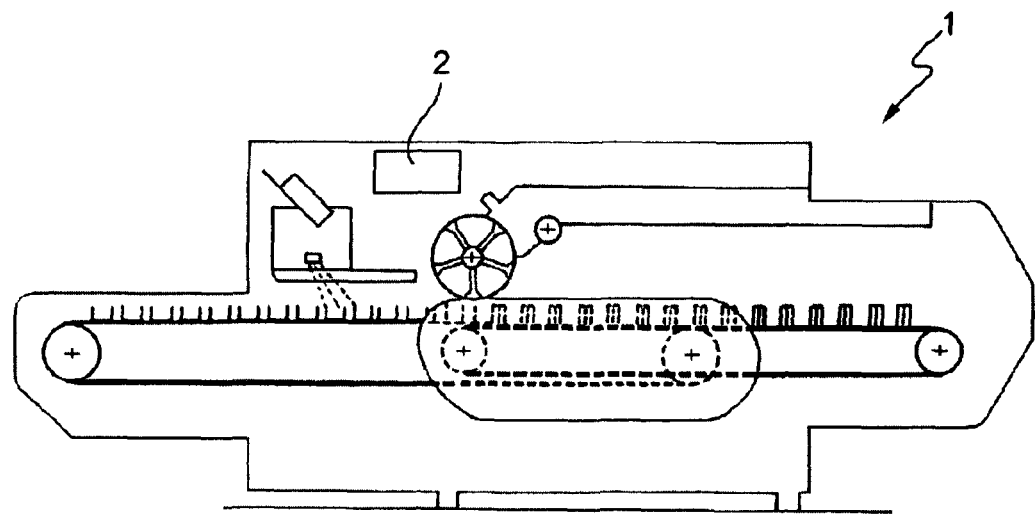
FIG. 1 illustrates, according to a lateral schematic view, an automatic machine, and in particular a cartoning machine, which is provided with a control device built according to the invention.

In FIG. 1, designated as a whole by 1 is an automatic machine, and in particular a cartoning machine for producing cartons starting from respective rough pieces of cardboard. The automatic machine 1 comprises a programmable electronic control device, designated by 2 in FIG. 1, for controlling operation of the automatic machine 1. The control device 2 is made in the form, for example, of one or more electronic cards, each of which mounts respective sets of electronic components. For reasons of simplicity, hereinafter it will be considered that the control device 2 will be produced in the form of a single electronic card.

Figure 2:
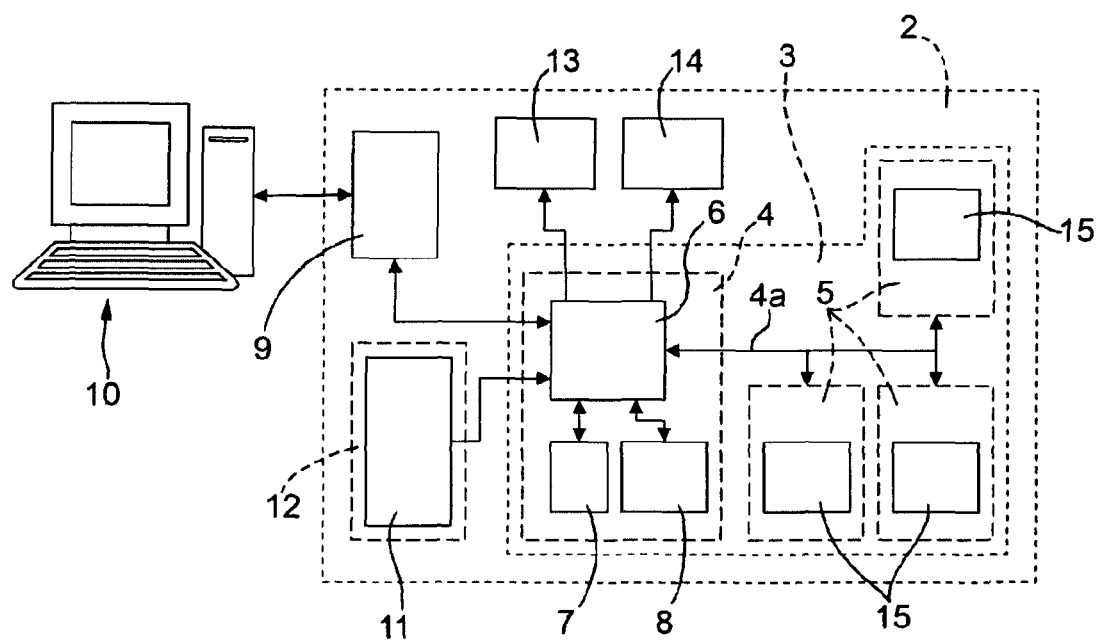
FIG. 2 illustrates, according to a block diagram, the structure of the control device of FIG. 1.

With reference to FIG. 2, the control device 2 comprises a PLC device 3, which comprises at least one processing module 4 and at least one additional module constituted, for example, by an input/output (I/O) module 5 governed by the processing module 4 for acquiring values of parameters of operation of the automatic machine 1 and supply command signals to various electromechanical actuators of the automatic machine 1, which is in itself known and hence not illustrated. In the example of FIG. 2 three input/output modules 5 are illustrated connected to the processing module 4 via a bus 4a of a known type.

The processing module 4 comprises a processor 6, a volatile memory 7 for loading programs to be run on the processor 6 and at least one non-volatile memory 8, in which a control program can be installed designed for implementing, when run on the processor 6, a logic or an algorithm for control of the automatic machine 1. The PLC device 3 comprises an operating system OS installed in the memory 8, which can be loaded in the memory 7 for being run on the processor 6 upon turning-on of the PLC device 3. The memory 7 is constituted, for example, by a DRAM memory module. The memory 8 is constituted, for example, by a flash memory module.

The control device 2 further comprises a communication port 9, for example an RS232 serial communication port, for receiving, from an external processing and programming unit, for example a personal computer 10, a new control program to be installed in the memory 8. The communication port 9 communicates with the processing module 4.

The control device 2 comprises a non-volatile memory module 11 removable from a respective base 12 fixed on the supporting element (not illustrated) of the electronic card constituting the control device 2. The base 12, and hence the memory module 11 when it is inserted in the base 12, is connected to the processing module 4. The memory module 11 is constituted, for example, by an EPROM memory module. The control program can be installed, instead of in the memory 8, in the memory module 11. In this case, installation of a new control program consists in replacement of the memory module 11 with a new analog memory module, in which the new control program is precisely installed.

The control device 2 further comprises human-machine interface means for enabling entry of data and commands by an operator of the automatic machine 1. The human-machine interface means comprise a keyboard 13 and a small display 14.

According to the present invention, each input/output module 5 comprises a respective non-volatile memory 15, for example, a memory of the same type as the memory 8, for storing, amongst other things, specific data of the input/output module 5. Said specific data comprise, for example, the model, type, and serial number of the module 5, date and time of installation of the module 5, and data regarding possible repair or maintenance operations carried out on the module 5.

The control device 2 is configured for implementing the method for monitoring the changes of configuration of the device 2 according to the invention, in the way described hereinafter.

Figure 3:
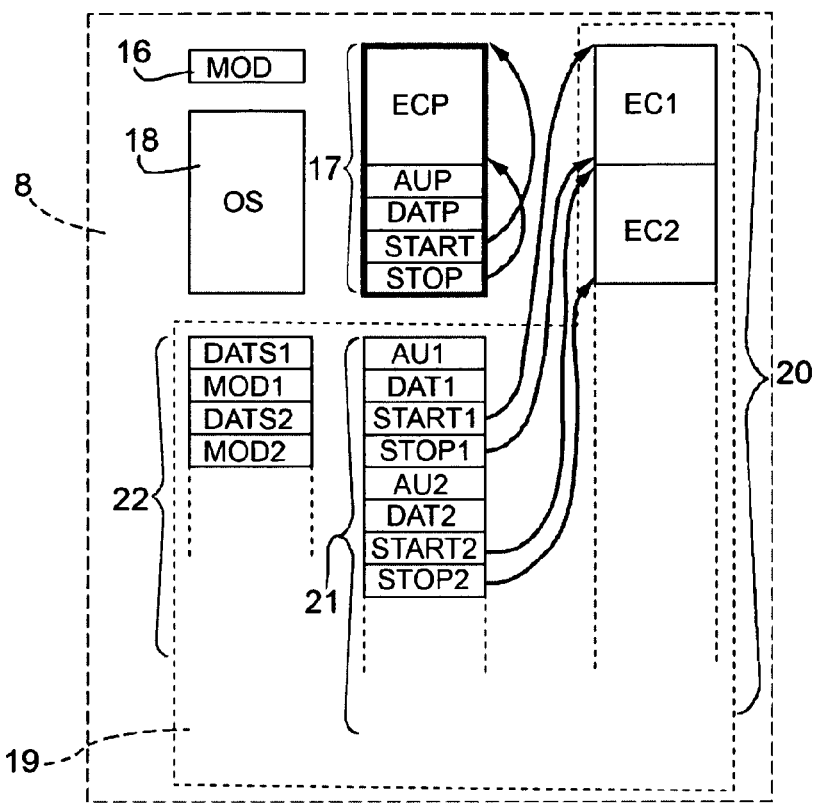
FIGS. 3 and 4 illustrate the information stored and the modes of storage of said information in the memory areas of modules of the control device in accordance with the method for monitoring changes of configuration of the control device provided according to the invention.

With reference to FIG. 3, the memory 8 of the processing module 4 comprises a memory portion 16 stored in which are specific data MOD of the processing module 4, for example the model, type, serial number of the module, date and time of installation of the module and data regarding possible repair or maintenance operations carried out on the module. The memory 8 comprises a reserved memory portion 17, installed in which is a priority control program, i.e., a factory control program defined and validated by the manufacturer of the automatic machine 1. The priority control program comprises an executable code ECP and two pointers START and STOP that point respectively to the first and last byte of the executable code ECP. The reserved memory portion 17 also comprises data of installation of the priority control program. These installation data comprise the author of the installation AUP and the date and time of installation DATP. Access to the reserved memory portion 17 is protected. In this way, it prevents any possible subsequent installation of a new control program from overwriting the priority control program.

The operating system OS of the control device 2 is installed in a memory portion 18 of the memory 8. The operating system OS is designed for implementing, when it is run on the processor 6, the method of the present invention, said method comprising the steps described in what follows.

First of all, each event of installation of a new control program is detected. In the case where the new control program is received from outside through the communication port 9 and is installed in the memory 8, the installation event is detected by monitoring the activity of the communication port 9. Instead, in the case where the new control program comes from a new memory module 11, the installation event is detected by detecting the presence of a new memory module 11 in the base 12. Before being installed, the new control program is compared with the control program installed last, which can be the priority control program or else another control program installed previously. The new control program is effectively installed if the new control program is different from the control program installed last. In addition, in the case where the new control program comes from a new memory module 11, the installation event is detected simply by comparing, upon each turning-on of the control device 2, the control program stored in the memory module 11 with the control program installed last to verify whether they are different. Hence, upon turning-on of the control device 2, the installation event is detected without detecting the presence of a new memory module 11 in the base 12.

Each new control program that is installed is recorded by being saved, together with corresponding installation data, in an archive memory portion 19 in the memory 8, so as to file all the changes of control program. The installation data comprise the author of the installation and the date and time of installation. FIG. 3 shows an example in which the control program has been changed twice, i.e., a first new control program has been installed and, subsequently, a second new control program has been installed. The second control program, i.e., the one installed last, is queued to the first control program, i.e., the one installed next to last. In particular, the executable code EC2 of the second control program is immediately queued to the executable code EC1 of the first control program in a first memory area 20 of the archive memory portion 19. The pointers START2, STOP2 and the installation data, i.e., author AU2 and date and time DAT2, of the second control program are immediately queued to the pointers START1, STOP1 and to the installation data, i.e., author AU1 and date and time DAT1, of the first control program in another memory area, designated by 21, of the archive memory portion 19. The two pointers of each control program point, respectively, to the first byte and to the last byte of the respective executable code EC1, EC2.

In the case where the new control program is the one contained in a new memory module 11, the author in the installation data is replaced by specific data of the memory module 11. Said specific data comprise, for example, the model, type, and serial number of the module 11, date and time of installation of the module 11, and data regarding any possible repair or maintenance operations carried out on the module 11.

The operating system OS normally enables execution of the control program installed last. When the automatic machine 1 is new, i.e., it not has undergone any re-programming, the control program installed last coincides with the priority control program. The control program installed last is queued in the archive memory portion 19. In particular, the operating system OS reads the pointers in the tail position of the memory area 21. Said pointers identify the executable code in the memory area 20. With reference to the example of FIG. 3, the tail pointers are the pointers START2 and STOP2. In the case where re-programming is carried out via replacement of the memory module 11, the control program installed last is a copy of the control program stored in the memory module 11 itself.

The operator of the automatic machine 1 can, at any one moment, restore the priority control program by entering a restore command in the control device 2. In particular, the operating system OS acquires entry of the restore command via the keyboard 13. If the restore command has been entered, then the operating system OS enables exclusively the execution of the priority control program, which is identified by the pointers START and STOP stored in the reserved memory portion 17.

In addition to each event of installation of a new control program, the operating system OS detects every event of replacement of an input/output module 5 with a respective new input/output module and/or every event of replacement of the processing module 4 with a new processing module.

When an event of replacement of one of the input/output modules 5 is detected, replacement data regarding the new input/output module are recorded by being saved in another memory area, designated by 22, of the archive memory portion 19. The replacement data comprise date and time of the replacement and the specific data of the new input/output module. FIG. 3 shows an example in which there have been two replacement events. The data of the second replacement event, i.e., the last one, are queued to those of the first replacement event, i.e., the next to last one. In particular, data of the second replacement, i.e., date and time DATS2 and specific data of the new module MOD2, are immediately queued to the data of the second replacement, i.e., DATS1 and MOD1.

Figure 4:
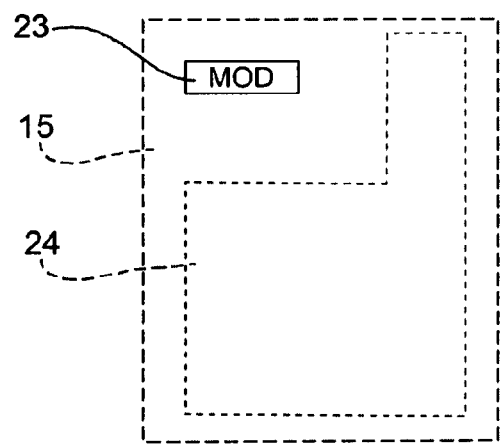

With reference to FIG. 4, the memory 15 of each input/output module 5 comprises a respective memory portion 23 stored in which are the specific data MOD of the input/output module 5 mentioned previously. In addition, the memory 15 comprises an archive memory portion 24, which is managed so as to be a copy of the portion of the archive memory portion 19 of the memory of the processing unit 4. In other words, saved in the archive memory portion 24 are, with the same modalities as those adopted for the archive memory portion 19, every new control program that is installed in the control device 2, the corresponding installation data, and the data of replacement regarding each new module that has replaced one of the input/output modules 5. Whenever an input/output module 5 is replaced with a module of a similar type, the operating system OS creates, in the memory 15 of the new module, the archive memory portion 24 by copying the archive memory portion 19.

It should be noted that the fact of having, in each of the input/output modules 5, an archive memory portion 24 that, in effect, is a copy of the archive memory portion 19 incorporated in the processing module 4, enables saving also of the event of replacement of the processing module 4 itself. For said purpose, when the new processing module 4 is turned on for the first time, the operating system OS creates, in the memory 8 of the new processing module 4, the archive memory portion 19 by copying the archive memory portion 24.

Advantageously, whenever a new control program is installed and upon every event of replacement of an input/output module 5 and/or of the processing module 4, the operating system OS carries out immediately one or more tests to verify compliance with requirements of operation pre-established by the manufacturer of the automatic machine 1. In particular, when the control program installed last is run on the processor 6, specific indicators of performance of the control program are measured, and the values of the performance indicators measured are compared with reference values or reference ranges to verify that the values measured respect pre-established conditions. In the case where the pre-established conditions are not fulfilled, the operating system OS inhibits execution of the program installed last. The performance indicators comprise, for example, the time of scanning of the control program. The measured scanning time must not exceed a maximum scanning time; otherwise, it could not guarantee a proper sampling, by the input/output modules 5, of the field signals and could hence cause malfunctioning of the automatic machine 1. Another example of performance indicators are the delay in propagation of the input and output signals through the input/output modules 5. In particular, the delays of propagation of the input signals must not exceed maximum input propagation delays, which are configuration parameters of the input filters of the input/output modules 5.

According to a further embodiment of the invention (not illustrated), the control device 2 comprises one or more peripherals, which are interfaced with the processing module 4 and each of which comprises a respective non-volatile memory for storing, amongst other things, specific data of the peripheral. Said peripherals comprise, for example, the display 14 illustrated in FIG. 2. The memory of each peripherals is of the same type, and is managed in the same way, as the memory 15 of the input/output modules 5; namely, it comprises a memory portion for storing the specific data of the peripheral and an archive memory portion managed as the archive memory portion 24, i.e., so as to be a copy of the archive memory portion 19 of the memory 8 of the processing unit 4. In addition, the operating system OS detects each event of replacement of one peripheral with a respective new peripheral.

According to a further embodiment (not illustrated) of the present invention, each control program pre-installed or installed subsequently in the memory 8 comprises corresponding configuration parameters. More precisely, the priority control program comprises priority configuration parameters defined and validated by the manufacturer of the automatic machine 1 and saved in the reserved memory portion 17 together with the executable code ECP. Each new control program that is installed in the memory 8 comprises corresponding configuration parameters, which are saved in the archive memory portion 19 together with the executable code of the control program. The configuration parameters of a control program comprise, for example, maximum time of scanning of the control program and parameters of the input filters of the input/output modules 5. The parameters of the input filters comprise the maximum input propagation times.

According to a further embodiment of the present invention (not illustrated), the PLC device 3 is of a monolithic type, i.e., is without the input/output modules 5 of FIG. 2, and the operating system OS is designed for implementing, when it is run on the processor 6, a simplified version of the method for monitoring the changes of configuration of the control device 2. Said simplified version of the monitoring method does not perform the steps, described above, of detecting each event of replacement of modules of the PLC device 3 with respective new modules and of saving of data of replacement regarding each new module.

According to a further embodiment of the present invention (not illustrated), in the archive memory portions 19 and 24 also important information regarding operation of the automatic machine 1 is saved, for example, time of operation, running time, number of pieces produced, number of pieces rejected. This information is saved for a programmable limited period of time, for example the last 24 hours, the last week, or the last year, or else for an unlimited period starting from start-up of the automatic machine 1. The fact of having a copy of the information of operation of the automatic machine 1 on each module 4, 5 enables recovery of said information in the event of damage or replacement of any other module 5, 4.

According to a further embodiment of the present invention (not illustrated), saved in the archive memory portions 19 and are also data regarding the production of the automatic machine 1, for example the instants of start and end of production of each production lot and the parameters of configuration of the control device 2 with which the automatic machine 1 has produced or processed each production lot. In this way, in the case where a production lot that is not compliant with the necessary requirements is found, it is possible to trace back with certainty to when said production lot was produced or processed and to the configuration of the control device 2 of the automatic machine 1 at that particular moment in order to be able to verify whether the non-compliance of the production lot depended upon a wrong configuration of the control device 2 and to be able to identify the operator who possibly configured the control device 2 erroneously.

According to a further embodiment of the present invention (not illustrated), the contents of the archive memory portions 19 and 24 are transferred into the external processing unit 10, which is interfaced with the PLC device 3 by means of the communication port 9. In this way, the contents of the archive memory portions 19 and 24 can be analysed off line in order, for example, to determine with greater precision the cause of a problem on the automatic machine 1. In fact, an external processing unit can be equipped with much more efficient analysis tools and interfaces than the ones that can be made available directly by the PLC device 3.

The main advantage of the method for monitoring changes of configuration of a control device 2 for an automatic machine 1 described above is to keep trace of any change of control program and of the corresponding configuration parameters and of each replacement of modules in the control device 2, thanks to the particular management of archive memory portions 19 and incorporated in the various modules 4 and 5. In other words, the method for monitoring changes of configuration of a control device 2 described above guarantees traceability of any modification of the hardware, firmware, and software of the control device 2 following upon a repair or updating of the control device 2 itself. This is extremely helpful during the steps of diagnosis and repair of the automatic machine 1 in so far as the traceability of the changes of the control program and of the modules makes it possible to trace back more easily to the origin of many cases of malfunctioning or breakdown of the automatic machine 1. The traceability of the changes enables an increase in the reliability of the automatic machine 1 from the standpoint of operation thereof and of safety for the operators, and enables respect of the correct parameters of the process of production executed by the automatic machine 1, and hence guarantees the suitability and quality of the products treated by the automatic machine 1 and their correspondence with the necessary requirements with the required continuity over time.

As described with various examples and details in the present document, each module 4, 5 of the device PCL 3 stores, in respective archive memory portions 19, 24, the control program installed last, together with the corresponding configuration parameters and the historic of all the control programs, and corresponding configuration parameters, installed previously and of the data of replacement of all the new modules 4, 5 of the PLC device 3 that have replaced similar modules. The particular structure of the archive memories 19, 24, which is redundant and distributed between the modules 4, 5, enables replication in all the modules 4, 5 of the historic of the installations and/or replacements of hardware, firmware, and software of the control device 2, thus making it possible to restore the control device 2 in its entirety, even if the PLC device 3 comprises just one module, for example the processing module 4. Hence, the redundant and distributed structure of the archive memories 19, 24 enables, in the event of replacement of a failed module 4, 5, automatic and secure configuration of the new module 4, 5 without requiring intervention of specialized staff.

Another advantage of the method for monitoring changes of configuration of a control device 2 for an automatic machine 1 described above is the capacity of being able to run a self-check whenever a new control program is installed or a module of the PLC device 3 is replaced. Said self-check enables monitoring of proper operation of the new control program and of the corresponding configuration parameters and the compliance of possible new modules installed before the control device 2 is effectively used, by signalling in a preventive way any possible incompatibility of the new program or module that could cause malfunctioning of the automatic machine 1, said malfunctioning possibly causing breakdown of the automatic machine or, even worse, danger for the operator.

The invention claimed is:

1. A method for monitoring changes of configuration of a control device of an automatic machine, the control device comprising a non-volatile memory, in which a control program for controlling the automatic machine can be installed, and at least one processing hardware module for executing the control program installed, the method comprising:
installing a predetermined priority control program in a reserved memory portion of said non-volatile memory;
detecting each event of installation of a new control program in the non-volatile memory;
enabling execution of a control program installed last; and
saving, in at least one archive memory portion of the non-volatile memory, each said new control program that is installed and data of installation of said new control program, wherein said new control program installed last is saved in the archive memory portion without overwriting or erasing said new control program installed next to last, wherein the control device further comprises at least one additional hardware module connected to and governed by said processing hardware module and/or at least one hardware peripheral interfaced with said processing hardware module, wherein the method further comprises: detecting each event of replacement of said at least one additional hardware module with a respective new additional hardware module, and/or each event of replacement of said at least one hardware peripheral with a new hardware peripheral and/or each event of replacement of said processing hardware module with a new processing hardware module; and saving, in said archive memory portion, replacement data regarding each said new additional hardware module, and/or each said new hardware peripheral, and/or each said new processing hardware module, wherein said replacement data comprises data and time of the replacement and specific data of the respective new processing hardware module, the respective new additional hardware module or the respective new hardware peripheral.

2. The method according to claim 1, wherein said control device comprises communication means for receiving, from an external unit, said new control program to be installed in the non-volatile memory; wherein said detecting each event of installation of said new control program in the non-volatile memory comprising: monitoring activity of said communication means.

3. The method according to claim 1, wherein the non-volatile memory comprises a memory module removable from a respective base fixed to the control device; said control program installed last being installed in said memory module; wherein said detecting each event of installation of said new control program in the non-volatile memory comprising: detecting a presence of a new memory module in said base.

4. The method according to claim 1, wherein said detecting each event of installation of said new control program in the non-volatile memory comprising: comparing said new control program to be installed with said control program installed last.

5. The method according to claim 1, wherein each control program that is installed comprises an executable code; an executable code of said control program installed last being queued to an executable code of a control program installed next to last.

6. The method according to claim 5, wherein each control program that is installed comprises two pointers that point, respectively, to a first byte and to a last byte of said executable code; an installation data and pointers of said control program installed last being queued to installation data and to pointers of said control program installed next to last.

7. The method according to claim 1, wherein the non-volatile memory comprises at least two archive memory portions, a first being incorporated in said processing hardware module and the second being incorporated in said at least one additional hardware module or in said at least one hardware peripheral; said replacement data being saved in said at least two archive memory portions.

8. The method according to claim 1, wherein the non-volatile memory comprises at least two archive memory portions, a first portion being incorporated in said processing hardware module and the second being incorporated in said at least one additional hardware module or in said at least one hardware peripheral; said each new control program that is installed and corresponding installation data are saved in said at least two archive memory portions.

9. The method according to claim 1, wherein said predetermined priority control program comprises corresponding priority-configuration parameters, which are saved in said reserved memory portion, and each new control program comprising corresponding configuration parameters.

10. The method according to claim 1, further comprising: executing said control program installed last; measuring indicators of performance of the control program installed last; verifying that values measured of the performance indicators respect pre-established conditions; and inhibiting execution of said control program installed last in the case where the pre-established conditions are not fulfilled.

11. The method according to claim 1, further comprising: saving, in said at least one archive memory portion, information regarding operation of said automatic machine, the information of operation comprising the time of operation, and/or the running time, and/or the number of pieces produced by the automatic machine, and/or the number of pieces rejected by the automatic machine.

12. The method according to claim 1, further comprising: saving, in said at least one archive memory portion, data regarding the production of said automatic machine, the production data comprising the instants of start and end of production or processing of each production lot and configuration parameters of said control device with which the automatic machine has produced or processed each production lot.

13. The method according to claim 1, further comprising: transferring the contents of said at least one archive memory portion into an external processing unit to be able to analyze said contents off line.

14. The method according to claim 1, further comprising: acquiring, via human-machine interface means, entry of a restore command; and enabling exclusively the execution of said predetermined priority control program if said restore command has been entered.

15. A control device for an automatic machine, the control device comprising a non-volatile memory, in which a control program for controlling the automatic machine can be installed, at least one processing hardware module for executing the control program installed, at least one input/output module governed by the processing hardware module, and/or at least one hardware peripheral interfaced with said processing module; the control device comprising an operating system, which is installed in said non-volatile memory and is designed for implementing, when run on said processing module, the method according to claim 1.

16. The control device according to claim 15, comprising human-machine interface means; said operating system being designed for implementing the method according to claim 14.

17. An automatic machine comprising a control device, which is comprised of the type defined in claim 15.

\* \* \* \* \*